(12) United States Patent
Fleege et al.

(10) Patent No.: US 9,227,525 B2
(45) Date of Patent: Jan. 5, 2016

(54) METHOD AND SYSTEM FOR CONTROLLING TORQUE IN AN ELECTRIC DRIVE POWERTRAIN

(71) Applicant: Deere & Company, Moline, IL (US)

(72) Inventors: Trent A. Fleege, Hazel Green, WI (US); Stacy K. Worley, Coffeyville, KS (US); Eric Vilar, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 68 days.

(21) Appl. No.: 14/053,154

(22) Filed: Oct. 14, 2013

(65) Prior Publication Data

US 2015/0105950 A1 Apr. 16, 2015

(51) Int. Cl.
*B60L 15/20* (2006.01)
*B60L 15/10* (2006.01)
*H02P 29/02* (2006.01)

(52) U.S. Cl.
CPC ............ *B60L 15/20* (2013.01); *B60L 15/10* (2013.01); *H02P 29/028* (2013.01)

(58) Field of Classification Search
CPC ........ B60L 15/20; B60L 15/10; H02P 29/028
USPC ................. 701/22, 50, 51, 54, 55, 61, 67, 68
See application file for complete search history.

(56) References Cited

U.S. PATENT DOCUMENTS

| 4,295,287 A | 10/1981 | Natzke et al. |
| 5,115,583 A | 5/1992 | Vail |
| 5,257,193 A | 10/1993 | Kusaka |
| 5,526,261 A | 6/1996 | Kallis |
| 5,636,120 A | 6/1997 | Yesel |
| 6,944,532 B2 | 9/2005 | Bellinger |
| 7,660,657 B2 | 2/2010 | DeMarco |
| 8,007,197 B2 | 8/2011 | Nye et al. |
| 8,974,137 B2 | 3/2015 | Parker et al. |
| 2002/0132699 A1 | 9/2002 | Bellinger |
| 2005/0252305 A1* | 11/2005 | Hubbard et al. ................ 73/860 |

(Continued)

FOREIGN PATENT DOCUMENTS

| EP | 1935228 A1 | 6/2008 |
| EP | 2055598 A2 | 5/2009 |

OTHER PUBLICATIONS

European Search Report; dated Feb. 26, 2015; 7 pages; issued by the European Patent Office.

*Primary Examiner* — Kim T Nguyen
(74) *Attorney, Agent, or Firm* — Taft Stettinius & Hollister LLP; Stephen F. Rost (57) ABSTRACT

This disclosure provides a method of controlling an electric drive powertrain system. The method includes providing an electric motor capable of running between a motor minimum speed and a motor maximum speed such that the electric motor can produce different amounts of torque between a first region defined between the motor minimum speed and a motor base speed and a second region defined between the motor base speed and the motor maximum speed. The method includes receiving a signal from operator inputs and determining a desired transmission output torque based on the signal received from the operator inputs. The method also includes determining a desired motor torque based on the desired transmission output torque, operating the electric motor at a current corresponding to the desired motor torque and producing a greater amount of torque at the motor base speed than at the motor minimum speed.

20 Claims, 7 Drawing Sheets

(56) References Cited

U.S. PATENT DOCUMENTS

| | | | |
|---|---|---|---|
| 2006/0217229 A1* | 9/2006 | Ogata | 477/15 |
| 2007/0166143 A1 | 7/2007 | Hart et al. | |
| 2008/0150460 A1* | 6/2008 | Rosskamp | 318/434 |
| 2009/0118943 A1 | 5/2009 | Heap | |
| 2009/0118947 A1* | 5/2009 | Heap et al. | 701/55 |
| 2009/0118950 A1* | 5/2009 | Heap et al. | 701/55 |
| 2009/0223215 A1 | 9/2009 | Kelly | |
| 2010/0030438 A1 | 2/2010 | Brattberg | |
| 2012/0081064 A1 | 4/2012 | Leaver | |
| 2013/0288856 A1* | 10/2013 | Li | 477/110 |

* cited by examiner

Fig. 7

METHOD AND SYSTEM FOR CONTROLLING TORQUE IN AN ELECTRIC DRIVE POWERTRAIN

FIELD OF THE DISCLOSURE

The present disclosure relates to a method of controlling torque, and in particular to a method and system for controlling torque in an electric drive powertrain.

BACKGROUND

Different work machines, particularly in the construction and forestry industries, can be designed with different power and torque requirements. This can also be the case with machines having electric drive powertrains. In some instances, the electric drive powertrain includes a transmission powered by an electric motor. The amount of torque provided by the motor can control the machine during operation. In addition, the power and torque ratio can change for different sized machines. As a result, the design of the powertrain system for larger machines can require an increase of costs due to the additional power and different performance requirements.

SUMMARY

In one embodiment of the present disclosure, a method is provided for controlling an electric drive powertrain system of a machine. The machine can include an inverter, a transmission having a plurality of selectable gears, and a transmission control unit including a memory unit and a processor. The method includes providing an electric motor capable of running between a motor minimum speed and a motor maximum speed, the electric motor configured to produce torque between a first region defined between the motor minimum speed and a motor base speed and a second region defined between the motor base speed and the motor maximum speed; receiving a signal from one or more operator control inputs; determining a desired transmission output torque based on the signal received from the one or more operator inputs; determining a desired motor torque based on the desired transmission output torque; determining a current in response to the desired motor torque; controllably operating the electric motor at low speeds at a current level less than or equal to the amount of current required at a maximum torque at base speed current in the first region; and producing a greater amount of torque at the motor base speed than the amount of torque produced at motor minimum speed.

In one example of this embodiment, the method can include producing torque at a substantially linearly or nonlinearly increasing rate in the first region. In a second example, the method can include producing torque at a continuously or discontinuously increasing rate in the first region. In a third example, the method can include producing torque at an exponentially increasing rate in the first region. In a fourth example, the method can include producing a peak output torque at the motor base speed. In a fifth example, the method can include producing substantially constant power in the second region.

In another example of this embodiment, the method can include producing a shift overlap between the plurality of selectable gears; and avoiding shift hunting between any of the plurality of selectable gears in the second region. In an alternative example, the method can include storing a set of instructions for a vehicle control logic in the memory unit; executing the vehicle control logic with the processor in response to the received signal from the one or more operator control inputs; and determining the desired motor torque in response to an output from the vehicle control logic. In a related example, the method can include determining a torque limit at the motor minimum speed in response to the output from the vehicle control logic. In yet a further example, the method can include storing a maximum torque response curve in the memory unit; running the electric motor at a motor speed between the motor minimum speed and the motor base speed; determining a maximum torque limit from the maximum torque response curve based on the motor speed at which the electric motor is running; comparing the desired motor torque with the maximum torque limit; and producing the desired motor torque if the desired motor torque is less than the maximum torque limit.

In another embodiment of this disclosure, a system is provided for controlling an electric motor of an electric drive powertrain for a work machine. The system includes a plurality of operator inputs configured to control the machine; an inverter electrically coupled to the electric generator, the inverter adapted to receive the electrical power from the electric generator; a transmission having a plurality of selectable gears; a transmission control unit for controlling the transmission and being in electrical communication with the inverter, the transmission control unit including a memory unit and a processor; and an electric motor coupled to an output of the inverter and an input of the transmission, the electric motor being operable between a motor minimum speed and a motor maximum speed; wherein, the motor is structured to produce torque between a first region of motor speeds defined between the motor minimum speed and a motor base speed and a second region of motor speeds defined between the motor base speed and the motor maximum speed; further wherein, a set of instructions is stored in the memory unit of the transmission control unit and executed by the processor, the set of instructions being executed to receive a signal from each of the plurality of operator inputs, determine a desired transmission output torque based on the signal received, determine a desired motor torque based on the desired transmission output torque; controllably operate the electric motor at a current less than or equal to an amount of current required at a maximum motor torque at motor base speed, and produce a greater amount of torque at the motor base speed than the amount of torque produced at motor minimum speed.

In one example of this embodiment, the set of instructions is executed by the processor to control the electric motor such that the amount of torque produced in the first region increases at one of a linear rate, a nonlinear rate, a continuous rate, or a discontinuous rate. In a second example, the system can include a second set of instructions stored in the memory unit and executable by the processor, the second set of instructions being executable to run a vehicle control logic in response to the signal received from the plurality of operator control inputs and determine the desired motor torque in response to an output from the vehicle control logic. In a third example, the set of instructions is executable to produce a shift overlap between each of the plurality of selectable gears and avoid shift hunting between any of the plurality of selectable gears in the second region. In another example, as the motor is running at a motor speed, the set of instructions stored in the memory unit is executable by the processor to determine a maximum torque limit from a maximum torque curve at the motor speed, compare the desired motor torque with the maximum torque limit at the motor speed, and control the electric motor to produce the desired motor torque only if the desired motor torque is less than the maximum torque limit at the motor speed.

In a different embodiment of this disclosure, a method is provided for controlling an amount of torque produced by an electric drive powertrain system of a machine. The machine can include one or more operator inputs, an inverter, a transmission having a plurality of selectable gears, and a transmission control unit including a memory unit and a processor. In this embodiment, the method includes providing an electric motor capable of running between a motor minimum speed and a motor maximum speed, the electric motor configured to produce torque between a first range of motor speeds defined between the motor minimum speed and a motor base speed and a second range of motor speeds defined between the motor base speed and the motor maximum speed; storing a maximum torque curve in the memory unit; operating the electric motor at a motor speed between the motor minimum speed and the motor maximum speed; receiving a signal from the one or more operator control inputs; determining a desired transmission output torque based on the signal received from the one or more operator inputs; determining a desired motor torque based on the desired transmission output torque; determining a maximum torque limit from the maximum torque curve at the motor speed; comparing the desired motor torque with the maximum torque limit at the motor speed; determining an amount of current to supply to the electric motor to produce the desired motor torque; producing the desired motor torque if the desired motor torque is less than the maximum torque limit at the motor speed; and producing a first amount of torque at the motor minimum speed and a second amount of torque at the motor base speed, wherein the first amount of torque is less than the second amount of torque.

In a first example of this embodiment, the method can include controlling the electric motor to produce an increasing amount of torque from the motor minimum speed to the motor base speed. In a second example, the method can include while operating the electric motor in the first region, controllably operating the electric motor at a current less than or equal to an amount of current required at a maximum motor torque at the motor base speed. In another example, the method can include determining a current gear ratio of the transmission; calculating the desired motor torque as a function of the desired transmission output torque and current gear ratio; producing a shift overlap between the plurality of selectable gears; and avoiding shift hunting between any of the plurality of selectable gears in the second region. In a different example, the method can include storing a set of instructions for a vehicle control logic in the memory unit; executing the vehicle control logic with the processor in response to the received signal from the one or more operator inputs; determining a torque limit at the motor minimum speed in response to the output from the vehicle control logic; and determining the desired motor torque in response to an output from the vehicle control logic.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Electric drive powertrain systems are becoming more common in different types of machines and vehicles. For manufacturers that produce a series of machines or vehicles, each machine or vehicle can include various characteristics to meet its desired or intended performance requirements. With a wheel loader, for example, this can include engine power, bucket capacity, and breakout force. Other characteristics can be important as well, including motor torque and inverter capability through a range of motor speeds. For manufacturers in the construction and forestry industries, for example, the machine layout and control strategy for meeting performance requirements can differ for different machines. A smaller machine may require a smaller motor capable of producing lower torque, whereas a larger machine may require more power. Similarly, a smaller machine may only require one inverter for providing current to an electric motor, whereas a larger machine may require larger inverters or multiple inverters. In any event, the cost of meeting the performance requirements for different machines can be significant.

The present disclosure provides a system and process for controlling electric motor torque in such a way that the system can be incorporated in different sized machines. In addition, the system and control process can achieve desired machine performance for the different sized machines while limiting or preventing a substantial increase in cost. Moreover, the system and control process achieve substantial gear shifting overlap such that the transmission can shift between gears or ranges without seeking or searching for the next gear or range. This is further described below.

Figure 1:
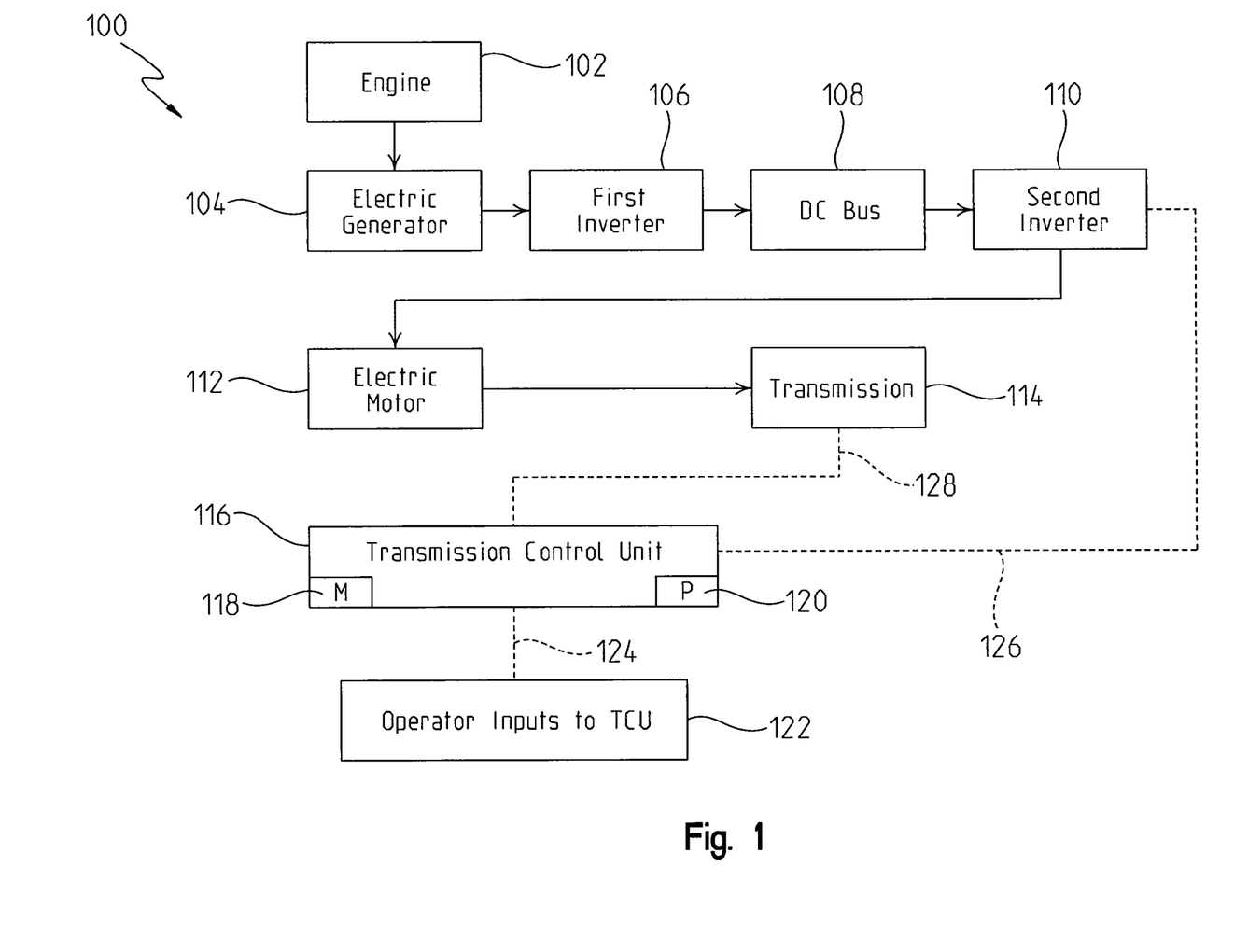
FIG. 1 is a schematic of a control system for an electric drive machine.

In FIG. 1, an electric drive powertrain system 100 according to one embodiment of the present disclosure is shown. The system 100 can include an engine 102 for providing mechanical power to drive the system 100. The engine 102 can be any conventional engine, e.g., a diesel engine, a gasoline engine, etc. In this system 100, the engine 102 can output mechanical power to an electric generator 104. The electric generator 104 can convert the mechanical power into electrical power such that the converted electrical power is received by a first inverter 106.

The electrical power can be transferred to a DC bus 108 and onto a second inverter 110. The second inverter 110 can be electrically coupled to an electric motor 112. The second inverter 110 can feed current to the electric motor 112 to drive the motor. The amount of current transferred to the motor 112 can be controlled via the second inverter 110 so that the desired output from the motor 112 is achieved. Although in FIG. 1 there is the first inverter 106 and the second inverter 110, the second inverter 110 is shown as a single inverter that controls the amount of current sent to the motor 112. The size and capability of the second inverter 110 is designed to achieve desired motor performance.

As the motor 112 is electrically driven by the current from the second inverter 110, the motor 112 can have an output shaft coupled to an input shaft of a transmission 114. In this manner, the motor 112 can mechanically drive the transmission 114. The transmission 114 can transfer mechanical power therethrough to an axle of the machine to propel the machine in one or more directions.

The transmission 114 can be any conventional transmission. In one aspect, the transmission is a series three speed electric transmission (STSE). The transmission 114 can have a plurality of automatically selected gears or ranges, where each gear or range has a discrete gear ratio. In another embodiment, the transmission can be a manually-operated transmission. In a further embodiment, the transmission can be an automated manual transmission. Moreover, the transmission can be an infinitely variable or continuously variable transmission.

The transmission 114 can be controlled by a transmission control unit 116. The transmission control unit 116 can include a memory unit 118 and a processor 120. A set of instructions for performing an algorithm, control software, control logic, or other control processes can be stored in the memory unit 118 and executed by the processor 120. For example, a transmission shift schedule can be stored in the memory unit 118 and then executed by the processor 120 to shift the transmission 114 through its different gears or ranges.

The transmission control unit 116 is disposed in electrical communication with the transmission 114 via a communication link 128. In this manner, the transmission control unit 116 can operably control the transmission 114 by communicating signals to the transmission 114 to achieve desired performance. The transmission control unit 116 can also be in electrical communication with a plurality of operator inputs 122. The operator inputs 122 can include a brake pedal, a throttle or accelerator pedal, and any other operator controls (e.g., levers, switches, joysticks, pedals, steering wheel, etc.). The operator inputs 122 can include sensors that detect movement of one of the operator controls and a signal can be sent via communication link 124 to the transmission control unit 116. In another aspect, the operator inputs 122 can be electrically communicated to a vehicle control unit (not shown), an engine control unit (not shown), or a combination of any of the three control units. In any event, operator inputs can produce a signal that is received by the transmission control unit 116.

The transmission control unit 116 can also be in electrical communication with the second inverter 110 via another communication link 126. In this arrangement, the transmission control unit 116 can determine what type of motor command needs to be sent to the motor 112. The transmission control unit 116 can then communicate the motor command to the second inverter 110, which in turn can determine from the motor command how much current to send to the electric motor 112. The amount of current sent to the motor 112 can produce a desired amount of torque that is transferred to the transmission 114. In this system 100, the transmission control unit 116 can operably control the electric motor 112 and transmission 114 to achieve desired performance.

Figure 2:
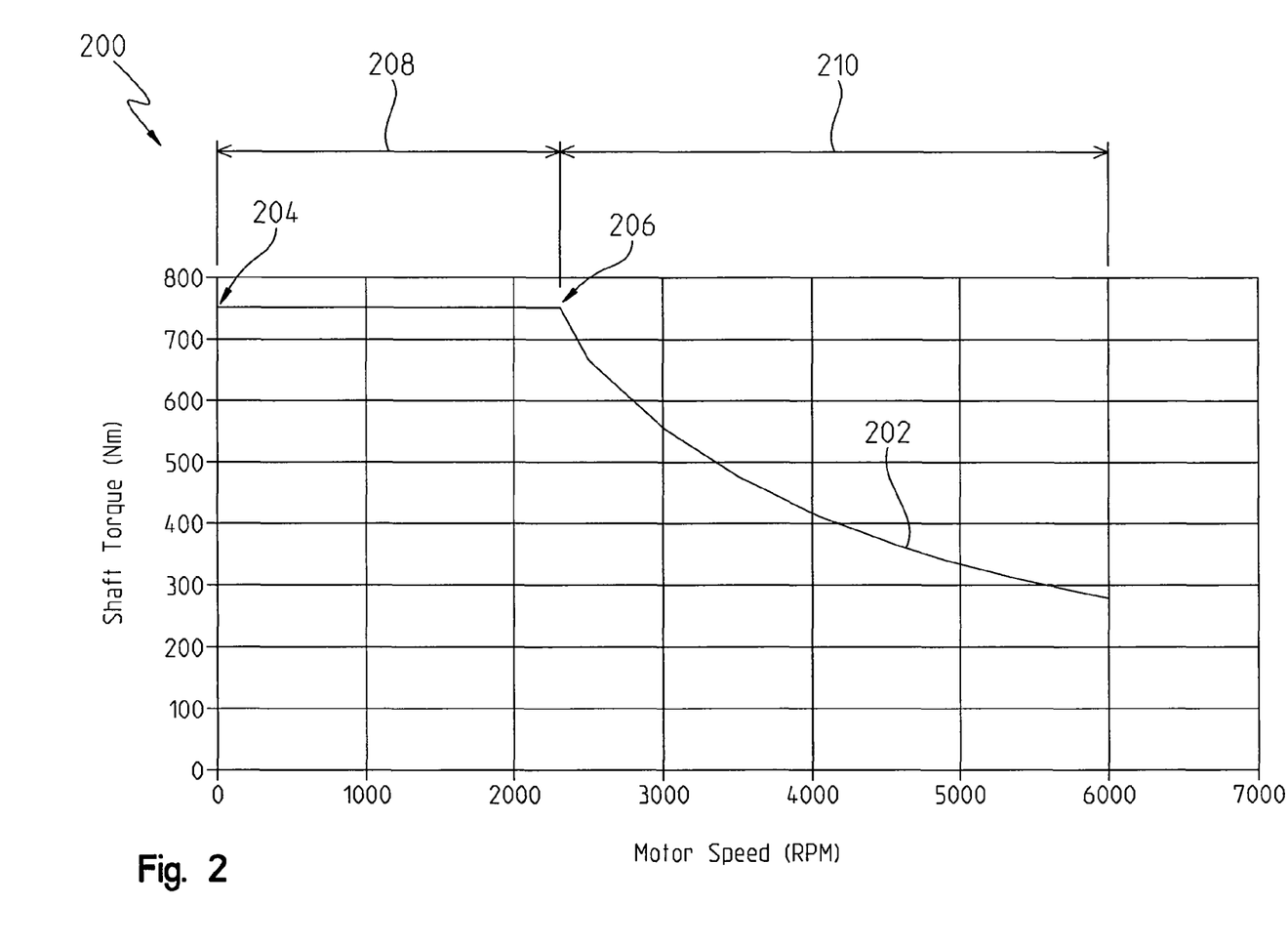
FIG. 2 is a graphical representation of a motor torque curve of an electric drive machine.

The control process and system of the present disclosure can control the amount of torque produced by the motor at different motor speeds. In a conventional electric drive powertrain system, the electric motor is designed to produce the same amount of torque between a motor zero speed and a motor base speed. An illustrative example of this is shown in FIG. 2. Referring to FIG. 2, a graphical representation 200 illustrates a motor output torque curve 202 compared to motor speed. In this example, there are two primary regions. First, there is a constant torque region 208 where the curve 202 remains substantially constant from a motor zero speed 204 to a motor base speed 206. The second region is a constant power region 210. These different speeds and regions will now be described in greater detail.

For purposes of this disclosure, at motor zero speed 204 the machine requires an amount of output torque from the electric motor to function without the transmission shifting gears. In one example, a front wheel loader can have a bucket or other work tool attached to its front end, and the torque at motor zero speed 204 is required to push the bucket into a rock pile. In this example, the motor speed is low and thus the machine is not shifting gears. Stated in another way, the torque at motor zero speed is required to dig out of the rock pile, for example, when the machine is either moving very slowly or not moving at all. Thus, the torque is the amount of push or force needed for the machine to impose on the rock pile. This can also be referred in terms of rimpull at motor zero speed. Motor zero speed can also be the torque or rimpull at which the motor is fully stalled (e.g., the motor is operating at or near motor zero speed but is being commanded to produce as much torque as possible).

At motor base speed 206, the amount of torque required from the motor is to shift the transmission between gears or ranges. For a transmission having three gears or ranges, each of which has its own discrete gear ratio, the shifting of the transmission can be achieved by shifting the transmission from one discrete gear ratio to a second discrete gear ratio. Thus, the shifting between gears can require there to be sufficient transmission output torque overlap between the gears or ranges in order to avoid shift hunting (i.e., searching for which gear to shift to in order to meet power requirements for machine performance). In FIG. 2, the motor base speed 206 is the point at which the constant torque region 208 intersects with the constant power region 210. As shown, the torque curve 202 has a defined "knee" or bend at the motor base speed 206, and the motor torque decreases as the motor speed increases at the motor base speed 206. The motor base speed 206 can be dependent on the design and type of electric motor used by the machine.

In the example above, the loader can have a vehicle stall torque requirement. This requirement can refer to how much or at what level of rimpull or torque the motor should provide at motor zero speed. The torque required at motor zero speed can be set by the transmission control unit (or vehicle controller) so that the machine can operate at this lower speed. This is further described below with reference to FIG. 6.

Figure 3:
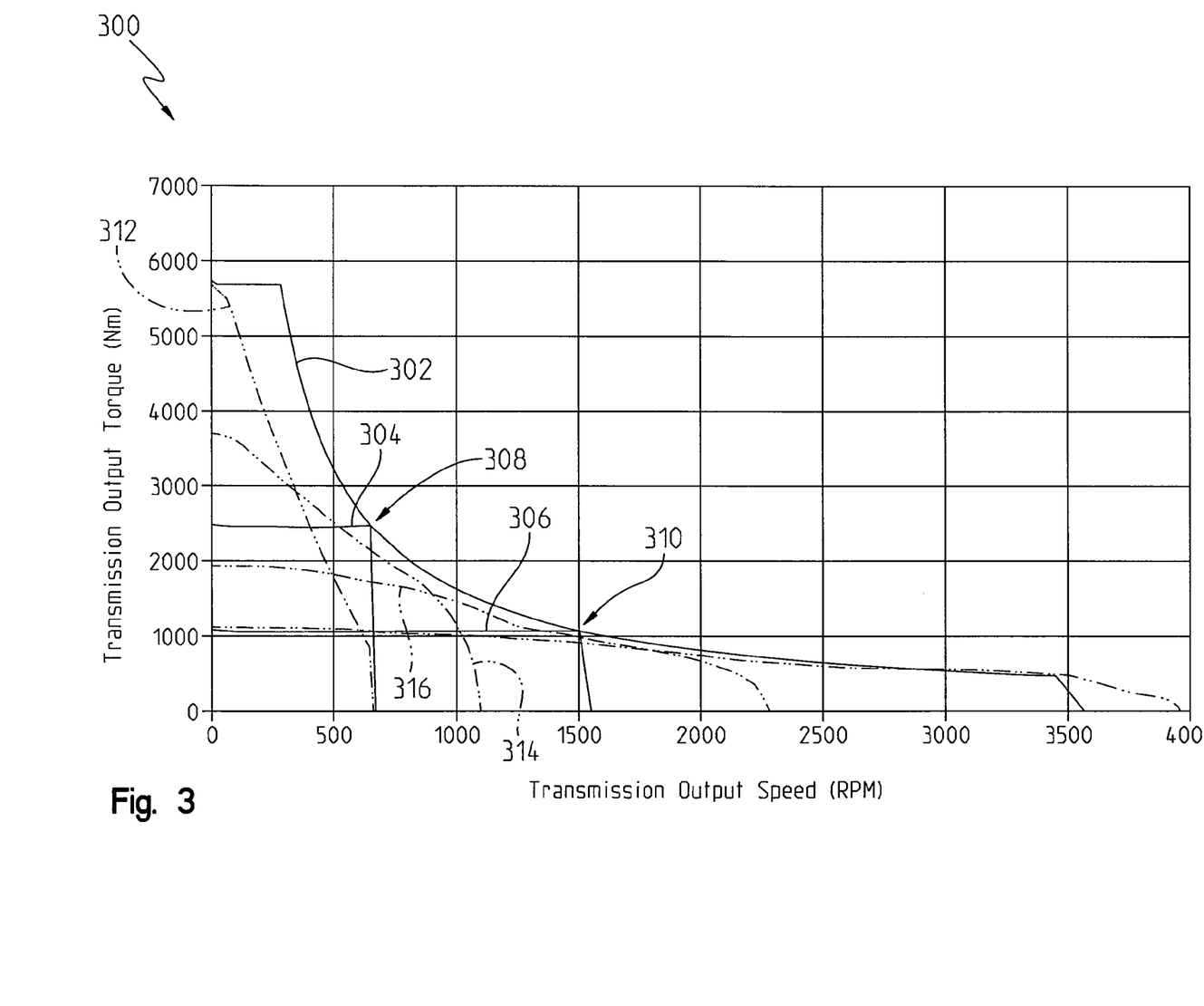
FIG. 3 is a graphical representation of transmission output torque for an electric drive machine.

As the machine size increases, however, the conventional motor design for smaller machines does not perform as well. In other words, the conventional motor control system and method of control is not a "one-size-fits-all" design. As described above, with larger machines the transmission control unit can begin to shift hunt during operation. Referring to FIG. 3, for example, a larger machine design that requires more power during operation can impact the amount of torque at the motor base speed. Here, the illustrated example 300 includes transmission output torque curves for three different gears or ranges. A first torque curve 302 can refer to the transmission operating in a first or lower gear (i.e., highest gear ratio optimal for lower speeds). A second torque curve 304 can refer to the transmission operating in a second or middle gear (i.e., having a gear ratio lower than the first gear). A third torque curve 306 can refer to the transmission operating in a third or high gear (i.e., lowest gear ratio optimal for higher speeds).

For vehicle performance, each of the torque curves is required to exceed or surpass vehicle performance threshold curves. For example, the illustrated example 300 includes a first threshold curve 312, a second threshold curve 314, and a third threshold curve 316, each of which corresponds to the first, second, and third gears or ranges of the transmission. As further shown, the first torque curve 302 provides greater output torque at the same output speed than is required of the first threshold curve 312. Likewise, the second torque curve 304 satisfies the vehicle requirements set forth by the second threshold curve 314 and the third torque curve 306 satisfies the vehicle requirements set forth by the third threshold curve 316. Nevertheless, in this example, the overlap between or intersection of the torque curves is minimal thus possibly resulting in shift hunting. This is shown, for example, as a first intersection point 308 between the first torque curve 302 and the second torque curve 304. Similarly, a second intersection point 310 is shown between the second torque curve 304 and the third torque curve 306. Thus, the speed "cushion" between gears or ranges may be insufficient to avoid shift hunting.

Although not shown in FIGS. 2 and 3, another issue with the conventional motor control is the amount of current required of the motor at the motor zero speed. This is particularly an issue with larger machines. As previously described, larger machines require more power to meet desired machine performance. This, however, does not scale proportionally at motor zero speed. In other words, the torque requirement at motor base speed can increase proportionally with the power requirement to maintain proper speed overlap between gears or ranges, but the torque at motor zero speed does not scale proportionally with the need for increased power. This, in effect, can have a negative impact on the capability and output of the motor inverter (i.e., the second inventor 110 in FIG. 1).

The inverter design can be generally based on the torque requirement at motor zero speed. More specifically, inverter design can be primarily based on the torque requirement up to the motor base speed. With the motor output torque being constant between the motor zero speed and motor base speed in FIG. 2, the current output required of the inverter is greater at motor zero speed compared to motor base speed. In particular, the current output at motor zero speed is greater than at motor base speed by a factor or ratio. This factor can be, for example, the square root of 2 (not accounting for any motor zero speed torque compensation). Thus, the conventional electric drive powertrain system is overdesigned at motor base speed in order to meet the vehicle requirements at motor zero speed.

Figure 7:
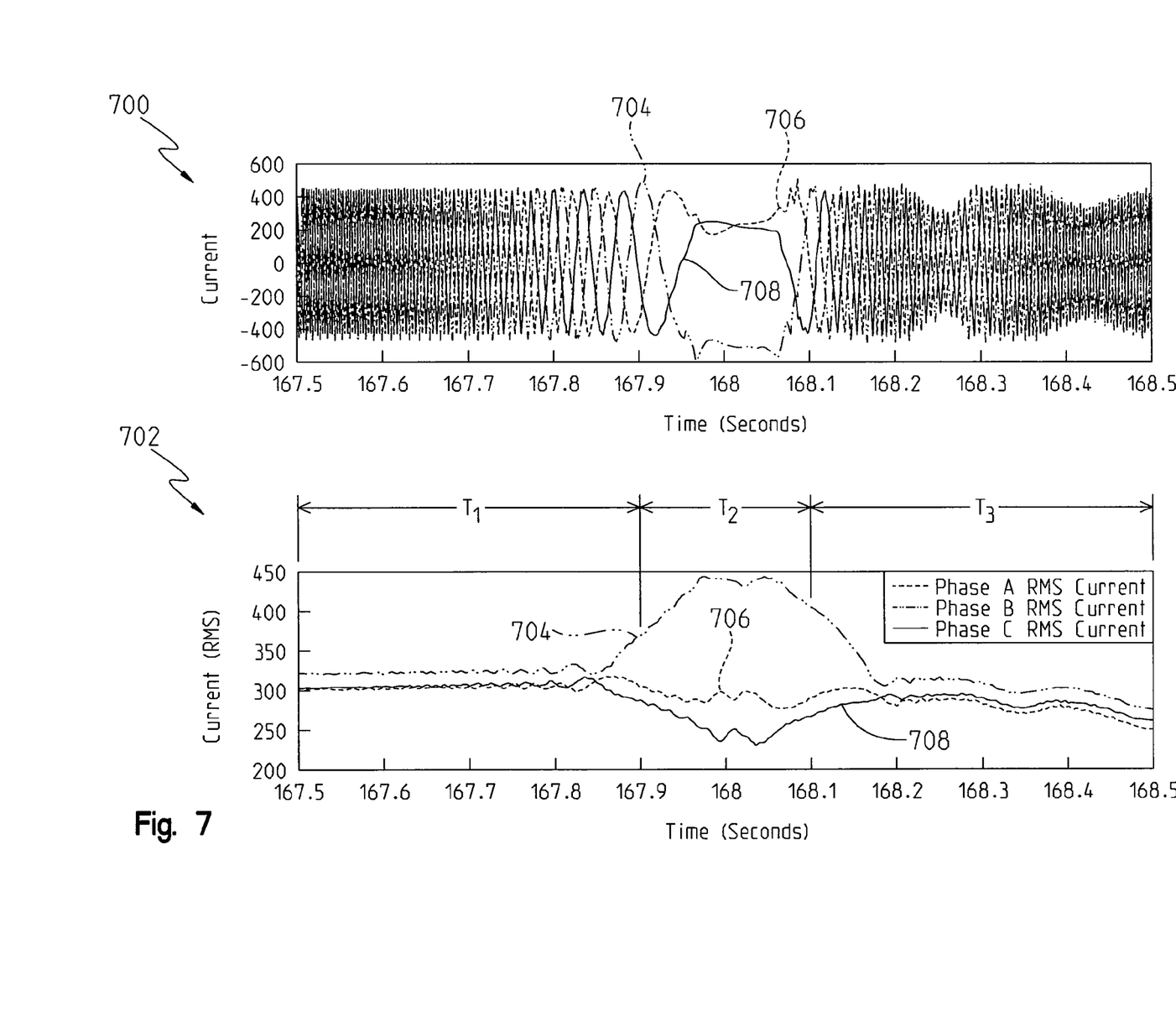
FIG. 7 is a graphical representation of current and current (RMS) over time for a three-phase electric motor.

This is further illustrated in FIG. 7. Here, the motor output is shown as having three phases each following a sinusoidal path. The first phase is shown by a first curve 704, the second phase is shown by a second curve 706, and the third phase is shown by a third curve 708. In FIG. 7, a first graphical representation 700 illustrates the three phases of current over time and a second graphical representation 702 illustrates the three phases of RMS current over time. For purposes of this disclosure, the RMS current refers to the root mean square which can be defined as the ratio of peak current to the factor of current output at motor zero speed compared to that at motor base speed (e.g., Peak Current/$\sqrt{2}$). The RMS current can also refer to an average current if the motor is running at a higher speed.

During operation, if the motor is running at a high speed (e.g., at or greater than motor base speed), the current output will not always be at its peak value. However, at lower speeds (e.g., particularly those at or close to motor zero speed), the motor inverter may be providing a current closer to peak current depending on where the current output is at for each particular phase curve. Thus, the inverter provides higher current at lower speeds (e.g., motor zero speed) compared to higher speeds (e.g., at or near motor base speed).

In FIG. 7, there are three time periods shown. During a first time period, $T_1$, the electric motor is running under normal conditions. As shown, each of the three curves are substantially sinusoidal over this time period. The same is true of a third time period, $T_3$. During this third time period, the current is shown as being substantially sinusoidal. However, in a second time period, $T_2$, the electric motor stalls. As shown, the first curve 704, second curve 706, and third curve 708 are no longer sinusoidal during the second time period, $T_2$. In this example, the second phase curve 706 is shown as being at or near its peak when the motor stalled, and thus its RMS current substantially increased during the second time period.

On an electric motor, the peak current can be achieved at a maximum torque stall condition as shown in FIG. 7. At motor zero speed if the motor stalls, the current is generally above the RMS current value. At higher speeds, however, the current output by the inverter to the motor is generally lower and is closer to RMS current. With conventional electric drive powertrain systems, this becomes problematic when the system is incorporated into a larger machine that requires more power to meet its desired performance. In effect and as described above, the amount of torque or rimpull at motor zero speed does not scale with this need for more torque at higher speeds. The higher torque output from the motor requires the motor inverter to be capable of delivering more current to the motor to meet these requirements. The more current required of the inverter therefore may increase the need for additional inverters in the system, which can increase the overall cost of the system.

Figure 4:
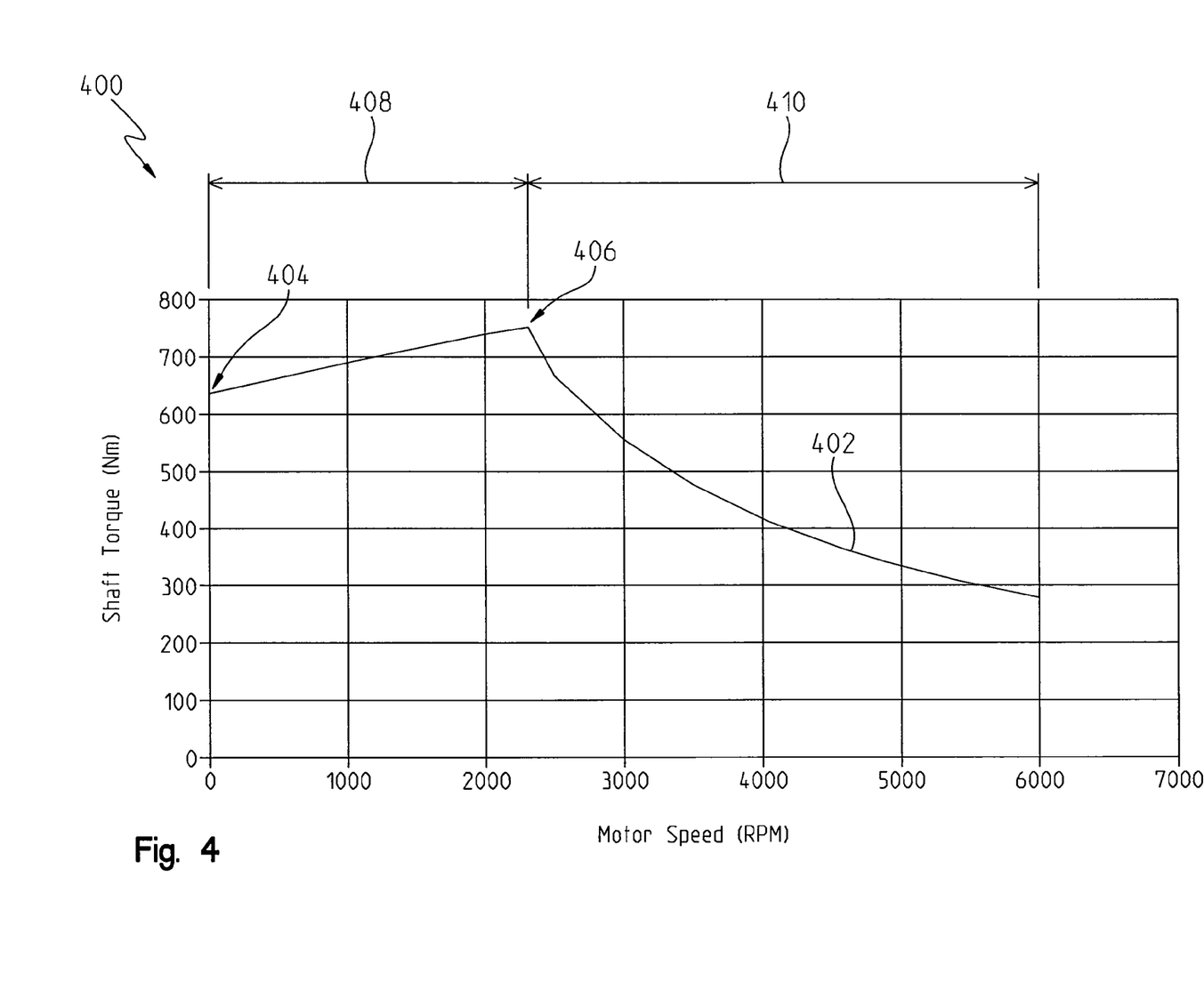
FIG. 4 is a modified graphical representation of a motor torque curve for an electric drive machine.

In a different embodiment of the present disclosure, the electric motor can be controlled in such a way that shift hunting is avoided and the system 100 can be used for larger machines that require additional power. An example of this improved control process is first illustrated in FIG. 4. Referring to FIG. 4, a graphical representation 400 includes a torque curve 402 as a function of motor speed. Similar to the illustrative example in FIG. 2, the graphical representation 400 in FIG. 4 is defined by two separate regions. Contrary to FIG. 2, however, a first region 400 in FIG. 4 is a non-constant torque region 408 at low motor speeds. A second region 410 is a constant power region 410. The motor speed at which the first region 408 and second region 410 intersect is a motor base speed 406. The first region 408 is defined between a motor zero speed 404 and the motor base speed 406.

In the illustrated example of FIG. 4, the motor output torque is controlled at a non-constant torque between the motor zero speed 404 and motor base speed 406. In this example, the torque increases at a substantially linear rate between the two speeds. In other examples, the torque can increase at a nonlinear rate (e.g., an exponential rate). In any event, while the motor is capable of being operated at a higher torque at lower speeds, the control process in FIG. 4 instead controls the inverter current output to the motor by providing a lower torque at the lower motor speeds. The torque output can increase up to the motor base speed to meet the vehicle performance requirements, i.e., the required increased output power. By reducing the amount of torque output by the motor at lower motor speeds, there is less current supplied by the inverter to the motor. Stated another way, the improved control process is designed to control the motor in such a way that the motor inverter outputs substantially constant current to the motor during the first region 208. In doing so, the inverter design can remain substantially the same.

Figure 5:
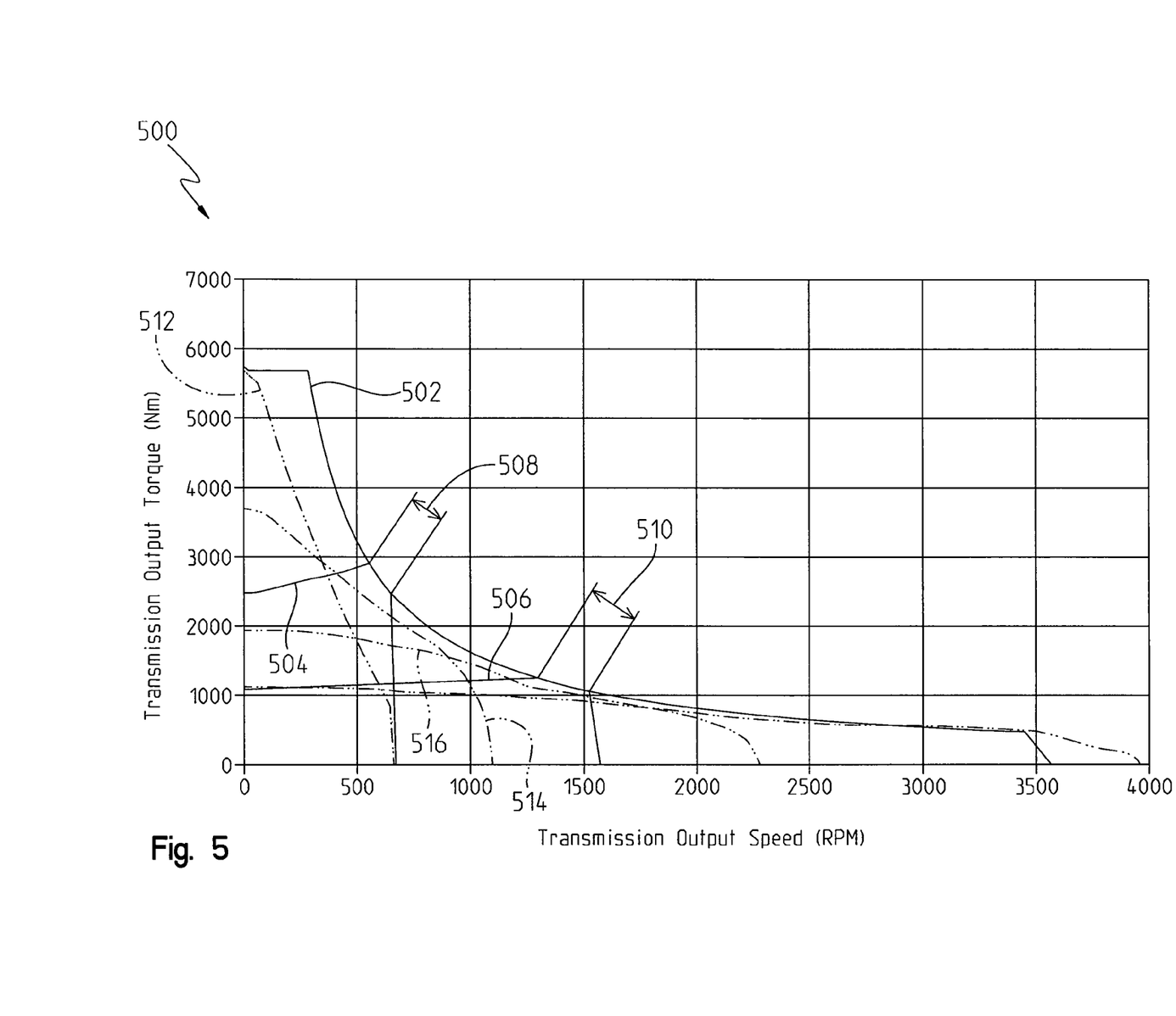
FIG. 5 is a modified graphical representation of transmission output torque for an electric drive machine.

As shown in FIG. 5, the improved control process can further achieve better shifting of the transmission between gears. In FIG. 5, a graphical representation 500 illustrates three different transmission output torque curves as a function of transmission output speed. A first curve 502 is representative of a first gear or range, where the first gear or range includes a first discrete gear ratio. A second curve 504 is representative of a second gear or range, where the second gear or range has a second gear ratio that is less than the first gear ratio. A third curve 506 is representative of a third gear or range, where the third gear or range has a third discrete gear ratio that is less than both the first and second gear ratios. While only three gears or ranges are shown, the present disclosure is applicable to any transmission capable of shifting between two or more gears or ranges.

Also shown in FIG. 5 are vehicle performance curves, e.g., a first performance curve 512, a second performance curve 514, and a third performance curve 516. Each performance curve represents a vehicle requirement or threshold for a given gear or range. As shown, the first curve 502 exceeds the first performance curve 512 and therefore meets the vehicle requirement in the first gear or range. Likewise, the second curve 504 exceeds the second performance curve 514 and thus satisfies the vehicle requirement in the second gear or range. The third curve 506 also exceeds the third performance curve 516 and therefore satisfies the vehicle requirement in the third gear or range.

As further shown in FIG. 5, the improved control process achieves sufficient speed overlap between gears to avoid shift hunting, which as shown in FIG. 3 can be problematic for conventional motor control processes. In particular, a first shift overlap region 508 is shown where the first torque curve 502 overlaps with the second torque curve 504 between approximately 525 RPM and 650 RPM. A second shift overlap region 510 is shown where the second torque curve 504 overlaps with the third torque curve 506 between approximately 1300 RPM and 1500 RPM. The speed overlap between gears or ranges allows the transmission to perform as desired.

Figure 6:
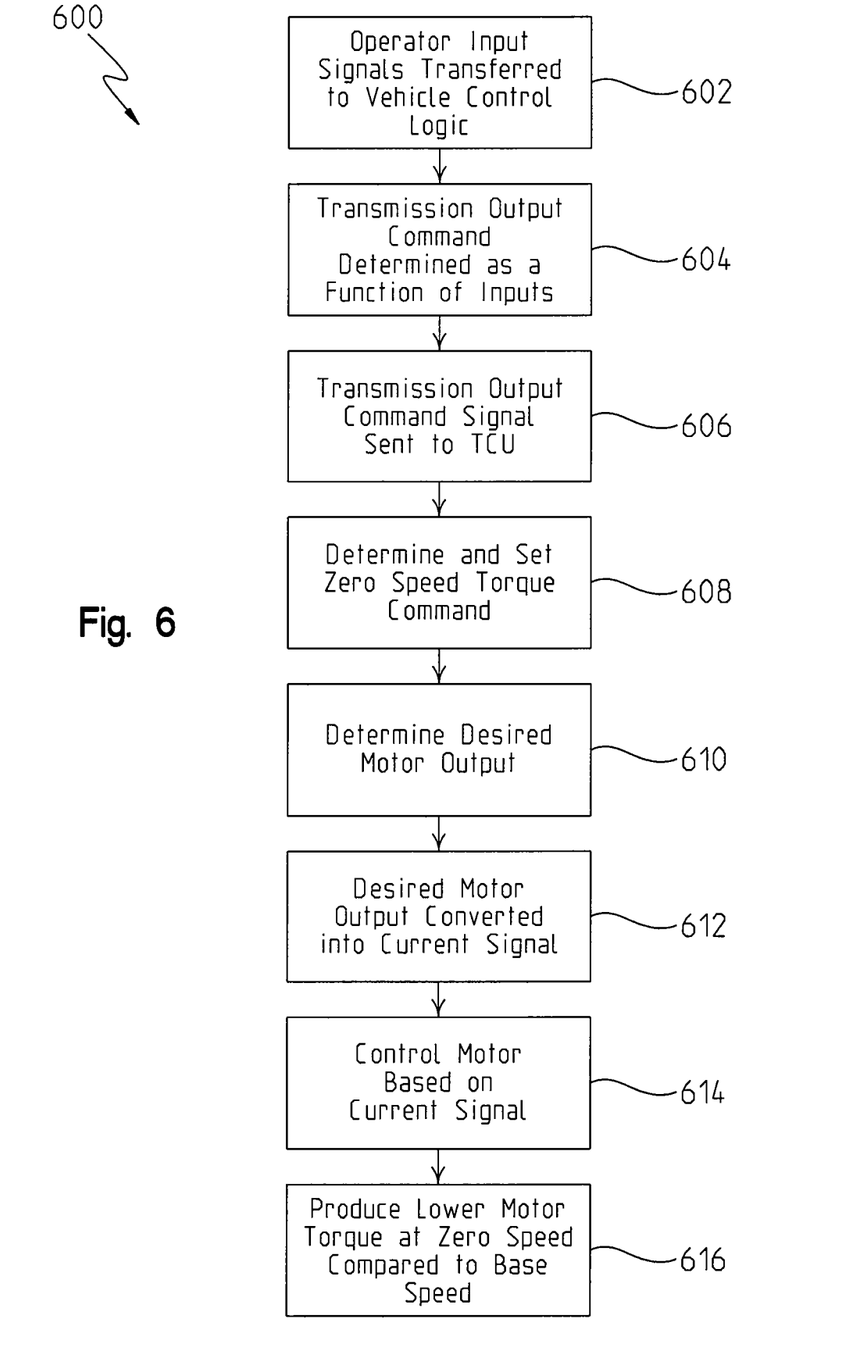
FIG. 6 is a flow diagram of a process for controlling motor torque of an electric drive powertrain.

An example of the improved control process is shown in FIG. 6. In FIG. 6, the improved control process is shown as a series of blocks that can be executed by the system 100 to achieve a torque boost strategy. Each block can include a step or series of steps performed in the process. Other aspects of the control process may perform a different series of blocks, and therefore FIG. 6 is only one example for controlling the motor output as desired.

The control process 600 in FIG. 6 provides a method for controlling the electric motor 112 from motor zero speed (i.e., motor minimum speed) to motor base speed. In this process, the control system determines the torque at motor zero speed as a function of a machine or vehicle stall torque requirement, and thereby utilize either a lower current rating for the second inverter 110 or, in some instances, uses only one second inverter 110 for a variety of different machines. In effect, the improved control process 600 can achieve better use of the current capability of the second inverter 110 than most conventional control processes. Again, this can be achieved since the amount of current required for the same amount of torque is highest at motor zero speed compared to motor base speed.

Although not shown in FIG. 1, the system 100 can further utilize one or more insulated-gate bipolar transistor (IGBT) switches that effectively controls the current and voltage of the motor 112. Each IGBT switch can be a three-terminal power semiconductor device that can form an electronic switch and achieve high efficiency. Each IGBT switch can include a rating for a certain amount of current. For applications that require more current, the system may require higher-rated IGBT switches or additional IGBT switches. This too can add cost to the overall system. In view of the control strategy set forth in FIGS. 4-6, the lower current rating at motor zero speed allows the improved control system to utilize a single inverter 110 and lower-rated IGBT switches.

Turning to the specifics of the illustrated embodiment in FIG. 6, the control process 600 can be defined as a series of algorithms, programs, logic, or functions stored in the memory unit 118 of the transmission control unit 116 and executed by the processor 120. For example, in a first block 602, the transmission control unit 116 can include a set of instructions stored in the memory unit 118 for performing a vehicle control logic. Alternatively, a vehicle control unit (not shown) or engine control unit (not shown) can include the vehicle control logic stored in its own memory unit. In another aspect, the vehicle control unit and the transmission control unit 116 can execute the vehicle control logic in conjunction with one another (i.e., certain steps are performed by one of the control units and other steps are performed by the other control unit).

In any event, the vehicle control logic can require a plurality of inputs including brake pedal output, accelerator or throttle output, machine or vehicle speed, engine speed, motor speed, motor torque command, and the vehicle stall torque requirement. The machine or vehicle speed can be measured by a speed sensor or accelerometer and communicated over a communication link or data bus (e.g., a J-1939 link) to the transmission control unit 116. Likewise, the engine speed can be measured by a sensor and communicated to the transmission control unit 116. Similarly, accelerator or throttle pedal position and brake pedal position can be communicated as inputs to the transmission control unit 116. The inputs received by the transmission control unit 116 can be stored in the memory unit 118, or the transmission control unit 116 can sample the signals over a period of time and calculate an average value for one or more of the inputs.

Once the inputs, including the operator inputs, are received by either the transmission control unit 116 or the vehicle control unit, the vehicle control logic can be executed in block 604 by the processor 120 transmission control unit 116 to determine how much transmission output torque is desired under the given circumstances. In a related aspect, the vehicle control unit can also include a memory unit and processor, whereby the processor of the vehicle control unit can execute all of or a portion of block 604. In any event, the vehicle control logic can include a series of calculations, interpolations, pulling information from look up tables, torque curves, and other graphical information in order to determine a transmission output torque command as a function of the inputs. Once the transmission output torque command is determined in block 604, the process 600 can advance to block 606 where the transmission output torque command signal is received by the transmission control unit 116 (particularly if the vehicle control unit is performing all of or a portion of the steps in block 604). If the transmission control unit 116 performs all of block 604, the processor 120 in effect executes the vehicle control logic and derives an output therefrom. This output, or also referred to as the transmission output torque command, is received by the transmission control unit 116 upon execution of the vehicle control logic.

Once the transmission control circuit 116 receives or determines the transmission output torque command, the improved control process 600 can next advance to block 608. Here, the transmission control circuit 116 can determine the current gear ratio or speed ratio of the transmission 114 and determine the desired motor torque therefrom to produce the desired transmission output. Moreover, in block 608, the transmission control unit 116 can determine the torque limit at motor zero speed. The torque limit at motor zero speed can be determined by the vehicle control logic stored in the memory unit 118 in block 608.

A maximum motor torque curve can be stored in the memory unit 118 of the transmission control unit 116 as determined by a specification of the electric motor 112. This maximum torque curve, or torque limit, can be a function of a set of conditions (e.g., current motor speed, operator inputs, etc.). In one example, the torque limit can be determined based on the torque along the maximum torque curve as a function of the motor speed at which the electric motor is currently running. As such, the transmission control unit 116 can determine how much motor torque is needed from the electric motor 112 in block 610 to produce the desired transmission output torque. In doing so, the transmission control unit 116 can compare the desired motor torque with the maximum torque curve stored in its memory unit 118 to ensure that the maximum torque at a given motor speed is not exceeded. Moreover, the transmission control unit 116 can take the transmission output command and a current gear (or gear ratio) and convert the command into the desired motor torque.

In another aspect, the torque limit for a given motor speed (e.g., motor zero speed, motor base speed, etc.) can be stored in a look up table or graph in the memory unit 118 of the transmission control unit 116. As such, in block 608, the transmission control unit 116 can retrieve the torque limit at motor zero speed by locating that torque value from its memory unit 118.

If the transmission control unit 116 determines that the desired torque output will not exceed the maximum torque limit, the transmission control unit 116 can further execute block 610 by sending a signal to the second inverter 110 in the form of the desired motor torque. Moreover, the second inverter 110 can determine the amount of current to send to the electric motor 112 to achieve the desired motor torque. In the example of FIG. 4, the motor torque at or near motor zero speed can be set at a lower torque value than at a higher motor speed such as, for example, motor base speed. In a further aspect, the torque command signals sent to the second inverter 110 can provide for an amount of current less than or equal to an amount of current required at a maximum motor torque at motor base speed to be sent to the motor 112 between motor zero speed and motor base speed to achieve desired performance.

If the transmission control unit 116 determines that the desired torque output does exceed the maximum torque limit, the transmission control unit 116 can execute block 610 by controllably operating the electric motor at or near the torque limit. In effect, the torque limit may be the maximum torque capable of being produced by the motor at the given motor speed.

In any event, the second inverter 110 can receive the desired motor output in block 610 and execute block 612 by determining the amount of current to send to the electric motor 112. The transmission control unit 116 and second inverter 110 can further execute block 614 by controlling the electric motor 112 via the amount of current sent thereto. Based on the current provided to the electric motor 112, the electric motor 112 can be controlled such that it produces lower torque at motor zero speed compared to the amount of torque produced at motor base speed. The motor 112 can be further controlled such that as the motor speed increases between motor zero speed and motor base speed, the amount of torque produced in block 616 can increase linearly, exponentially, non-linearly, continuously, discontinuously, etc.

In an alternative embodiment, the transmission output command can be determined as a function of vehicle requirements, which may be stored in a vehicle control unit or engine control unit. In this embodiment, the transmission output command can be sent to the transmission control unit 116 from either control unit. Once the transmission control unit 116 receives the transmission output torque command, the transmission control unit 116 can then compare the desired transmission output torque as a function of the maximum torque limit and further convert the command into desired motor torque.

In the above-described embodiment, the motor torque curve (as shown in FIG. 4) can be set based on the motor zero speed and motor base speed of the given electric motor. The peak or maximum motor torque may be achieved at motor base speed such that the amount of torque produced by the motor between motor zero speed and motor base speed increases at some rate (e.g., linearly, non-linearly, continuously, discontinuously, etc.). The motor torque required at motor zero speed can be set based on the machine or vehicle stall torque requirement, and the motor torque required at motor base speed can be dependent upon the amount of power required by the machine or vehicle to meet desired performance requirements. Thus, the shape of the motor torque curve in FIG. 4 can depend on a variety of factors and can vary for different types of motors and different types of machines (particularly those with different or unique performance requirements).

Other embodiments are also contemplated by the present disclosure for determining a desired output transmission in response to motor torque. The manner in which this is achieved can vary for different embodiments as well. There can also be an algorithm or logic stored in the memory unit 118 of the transmission control unit 116 and executed by the processor 120 for controlling motor torque when the transmission control unit 116 determines a shift is needed between gears or ranges. In the improved control process 600 of FIG. 6, the control of shifting the transmission between any of the plurality of selectable gears can be achieved without inducing any gear hunting or the like. In other words, the increase of motor torque between motor zero speed and motor base speed provides sufficient shift overlap between the plurality of selectable gears of the transmission. The shift overlap, as shown in FIG. 5 and described above, can be defined by the range of transmission output speeds between the plurality of selectable gears. This further allows the transmission to function in a desirable manner by more easily shifting between selectable gears and producing desired motor and transmission output responses.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of controlling an electric drive powertrain system of a machine, the machine including an inverter, a transmission having a plurality of selectable gears, and a transmission control unit including a memory unit and a processor, comprising:
providing an electric motor capable of running between a motor minimum speed and a motor maximum speed, the electric motor configured to produce torque between a first region defined between the motor minimum speed and a motor base speed and a second region defined between the motor base speed and the motor maximum speed;
receiving a signal from one or more operator control inputs;
determining a desired transmission output torque based on the signal received from the one or more operator inputs;
determining a desired motor torque based on the desired transmission output torque;
while operating the electric motor in the first region, controllably operating the electric motor at a current less than or equal to an amount of current required at a maximum motor torque at the motor base speed; and
producing a greater amount of torque at the motor base speed than an amount of torque produced at the motor minimum speed.

2. The method of claim 1, further comprising producing torque at a substantially linearly or nonlinearly increasing rate in the first region.

3. The method of claim 1, further comprising producing torque at a continuously or discontinuously increasing rate in the first region.

4. The method of claim 1, further comprising determining an amount of current in response to the desired motor torque.

5. The method of claim 1, further comprising producing a peak output torque at the motor base speed.

6. The method of claim 1, further comprising producing substantially constant power in the second region.

7. The method of claim 1, further comprising:
producing a shift overlap between the plurality of selectable gears; and
avoiding shift hunting between any of the plurality of selectable gears in the second region. of at least 100 RPM of transmission output speed.

8. The method of claim 1, further comprising:
storing a set of instructions for a vehicle control logic in the memory unit;
executing the vehicle control logic with the processor in response to the received signal from the one or more operator control inputs; and
determining the desired motor torque in response to an output from the vehicle control logic.

9. The method of claim 8, further comprising determining a torque limit at the motor minimum speed in response to the output from the vehicle control logic.

10. The method of claim 1, further comprising:
storing a maximum torque response curve in the memory unit;
running the electric motor at a motor speed between the motor minimum speed and the motor base speed;
determining a maximum torque limit from the maximum torque response curve based on the motor speed at which the electric motor is running;
comparing the desired motor torque with the maximum torque limit; and
producing the desired motor torque if the desired motor torque is less than the maximum torque limit.

11. A system for controlling an electric motor of an electric drive powertrain for a work machine, comprising:
a plurality of operator inputs configured to control the machine;
a transmission having a plurality of selectable gears;
a transmission control unit for controlling the transmission, the transmission control unit including a memory unit and a processor; and
an electric motor coupled to an output of the inverter and an input of the transmission, the electric motor being operable between a motor minimum speed and a motor maximum speed;
wherein, the motor is controllable to produce torque between a first region of motor speeds defined between the motor minimum speed and a motor base speed and a second region of motor speeds defined between the motor base speed and the motor maximum speed;
further wherein, a set of instructions is stored in the memory unit of the transmission control unit and executed by the processor, the set of instructions being executed to receive a signal from each of the plurality of operator inputs, determine a desired transmission output torque based on the signal received, determine a desired motor torque based on the desired transmission output torque, controllably operate the electric motor at a current less than or equal to an amount of current required at a maximum motor torque at the motor base speed, and produce a greater amount of torque at the motor base speed than a first amount of torque produced at the motor minimum speed.

12. The system of claim 11, wherein the set of instructions is executed by the processor to control the electric motor such that a second amount of torque produced in the first region increases at one of a linear rate a nonlinear rate, a continuous rate, or a discontinuous rate.

13. The system of claim 11, further comprising a second set of instructions stored in the memory unit and executable by the processor, the second set of instructions being executable to run a vehicle control logic in response to the signal received from the plurality of operator control inputs and determine the desired motor torque in response to an output from the vehicle control logic.

14. The system of claim 11, wherein the set of instructions is executable to produce a shift overlap between each of the plurality of selectable gears and avoid shift hunting between any of the plurality of selectable gears in the second region.

15. The system of claim 11, wherein as the motor is running at a motor speed, the set of instructions stored in the memory unit is executable by the processor to determine a maximum torque limit from a maximum torque curve at the motor speed, compare the desired motor torque with the maximum torque limit at the motor speed, and control the electric motor to produce the desired motor torque only if the desired motor torque is less than the maximum torque limit.

16. A method of controlling an amount of torque produced by an electric drive powertrain system of a machine, the machine including one or more operator inputs, an inverter, a transmission having a plurality of selectable gears, and a transmission control unit including a memory unit and a processor, comprising:
providing an electric motor capable of running between a motor minimum speed and a motor maximum speed, the electric motor configured to produce torque between a first range of motor speeds defined between the motor minimum speed and a motor base speed and a second range of motor speeds defined between the motor base speed and the motor maximum speed;

storing a maximum torque curve in the memory unit;

operating the electric motor at a motor speed between the motor minimum speed and the motor maximum speed;

receiving a signal from the one or more operator control inputs;

determining a desired transmission output torque based on the signal received from the one or more operator inputs;

determining a desired motor torque based on the desired transmission output torque;

determining a maximum torque limit from the maximum torque curve at the motor speed;

comparing the desired motor torque with the maximum torque limit;

determining an amount of current to supply to the electric motor to produce the desired motor torque;

producing the desired motor torque if the desired motor torque is less than the maximum torque limit; and producing a first amount of torque at the motor minimum speed and a second amount of torque at the motor base speed, wherein the first amount of torque is less than the second amount of torque.

17. The method of claim 16, further comprising controlling the electric motor to produce an increasing amount of torque from the motor minimum speed to the motor base speed.

18. The method of claim 16, further comprising while operating the electric motor in the first region, controllably operating the electric motor at a current less than or equal to an amount of current required at a maximum motor torque at the motor base speed.

19. The method of claim 16, further comprising:

determining a current gear ratio of the transmission;

calculating the desired motor torque as a function of the desired transmission output torque and current gear ratio;

producing a shift overlap between the plurality of selectable gears; and avoiding shift hunting between any of the plurality of selectable gears in the second region.

20. The method of claim 16, further comprising:

storing a set of instructions for a vehicle control logic in the memory unit;

executing the vehicle control logic with the processor in response to the received signal from the one or more operator inputs;

determining a torque limit at the minimum motor speed in response to the output from the vehicle control logic; and determining the desired motor torque in response to an output from the vehicle control logic.

* * * * *